United States Patent
Lv

(10) Patent No.: US 9,148,318 B2
(45) Date of Patent: Sep. 29, 2015

(54) EQUALIZATION METHOD AND EQUALIZER FOR RECEIVED SIGNALS IN MICROWAVE MIMO SYSTEM

(71) Applicant: Huawei Technologies Co., Ltd., Shenzhen (CN)

(72) Inventor: Rui Lv, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/566,289

(22) Filed: Dec. 10, 2014

(65) Prior Publication Data
US 2015/0092831 A1 Apr. 2, 2015

Related U.S. Application Data

(63) Continuation of application No. PCT/CN2012/076713, filed on Jun. 11, 2012.

(51) Int. Cl.
*H03H 7/30* (2006.01)
*H04L 25/03* (2006.01)

(52) U.S. Cl.
CPC .... *H04L 25/03821* (2013.01); *H04L 25/03159* (2013.01); *H04L 25/03891* (2013.01); *H04L 2025/03414* (2013.01); *H04L 2025/03426* (2013.01)

(58) Field of Classification Search
CPC .............. H04L 25/03821; H04L 25/03891
USPC .......................................... 375/229
See application file for complete search history.

(56) References Cited

U.S. PATENT DOCUMENTS

| | | | | |
|---|---|---|---|---|
| 4,701,783 A * | 10/1987 | Glenn | ........................ | 375/240.25 |
| 7,308,048 B2 * | 12/2007 | Wei | ................................ | 375/326 |
| 7,447,971 B2 * | 11/2008 | Sherlock | ........................ | 714/751 |
| 2007/0133723 A1 | 6/2007 | Cheong et al. | | |
| 2009/0161779 A1 | 6/2009 | Zhidkov et al. | | |
| 2012/0120256 A1 * | 5/2012 | Hwang et al. | .............. | 348/207.1 |
| 2014/0286397 A1 * | 9/2014 | Chen et al. | .............. | 375/240.02 |
| 2014/0286648 A1 * | 9/2014 | Buelow | ........................ | 398/143 |

FOREIGN PATENT DOCUMENTS

| | | |
|---|---|---|
| CN | 1918811 A | 2/2007 |
| CN | 101420406 A | 4/2009 |
| CN | 102195757 A | 9/2011 |
| EP | 2503704 A1 | 9/2012 |

OTHER PUBLICATIONS

Foschini, G.J., "Layered Space-Time Architechture for Wireless Communication in a Fading Environment When Using Multi-Element Antennas," Lucent Technologies Inc., Bell Labs Technical Journal, Oct. 1996, pp. 41-59.

* cited by examiner

*Primary Examiner* — Santiago Garcia
(74) *Attorney, Agent, or Firm* — Slater & Matsil, L.L.P.

(57) ABSTRACT

The present invention provides an equalization method and an equalizer for received signals in a microwave MIMO system. By performing vertical spatial filtering on and combining internal sub-signals for n received signals, an initial sliced signal corresponding to a received signal currently to be decoded is obtained; (n−1) ICI signals are generated based on (n−1) initial sliced signals corresponding to other (n−1) received signals; after the (n−1) ICI signals are eliminated from the n received signals, vertical spatial filtering is performed and internal sub-signals are combined to obtain a final sliced signal.

19 Claims, 6 Drawing Sheets ns in the MIMO system, and a coefficient for
EQUALIZATION METHOD AND EQUALIZER FOR RECEIVED SIGNALS IN MICROWAVE MIMO SYSTEM This application is a continuation of International Application No. PCT/CN2012/076713, filed on Jun. 11, 2012, which is hereby incorporated by reference in its entirety.

TECHNICAL FIELD

Embodiments of the present invention relate to the field of mobile communication technology, and in particular, to an equalization method and an equalizer for received signals in a microwave multiple-input multiple-output (MIMO) system.

BACKGROUND

In a MIMO communication system, a received signal of each receive antenna is subject to two types of interference: inter-symbol interference (ISI) and inter-channel interference (ICI). ISI is interference of the tail of an earlier signal to a subsequent signal during signal transmission. ICI is adjacent-channel interference caused by a receive antenna receiving a signal from another antenna. To obtain reliable communication performance, in a MIMO system, ISI and ICI of a received signal need to be eliminated at a receive end.

An existing equalizer in a microwave MIMO system includes a plurality of sets of parallel-connected finite impulse response (FIR) transversal filters and a signal combination point. Each FIR transversal filter performs equalization filtering on received signals of an antenna, and adopts the equalization principle to eliminate ISI from each tributary signal. Moreover, while performing the equalization, a set of FIR transversal filters adjusts a weight coefficient for outputting the received signals of each antenna, thereby achieving reverse elimination of ICI by using the weight coefficient during combination and eliminating ICI at a signal combination point.

By adopting the foregoing existing equalizer, elimination of the ICI is implemented when each FIR transversal filter adjusts a weight coefficient to approximate an inverse matrix coefficient of a MIMO channel. An algorithm for approximating an inverse matrix coefficient of a MIMO channel by adjusting the weight coefficient is affected by the singularity degree of the MIMO channel. Therefore, the foregoing method is only applicable to a microwave MIMO system with a sparse antenna array. When applied to a microwave MIMO system with a compact antenna array, the method has a poor effect in eliminating ICI and transmission performance severely deteriorates.

SUMMARY

In one aspect, the present invention provides an equalization method for received signals in a MIMO system, to overcome the drawbacks of the prior art and improve the effect of eliminating ICI from received signals.

In another aspect, the present invention provides an equalizer for received signals in a MIMO system, to overcome the drawbacks of the prior art and improve the effect of eliminating ICI from received signals.

One aspect of the present invention provides an equalization method for received signals in a multiple-input multiple-output MIMO system, including: performing vertical spatial filtering on n received signals; combining internal sub-signals for the n received signals after vertical spatial filtering, to obtain an initial sliced signal, where n is the total number of transmit antennas in the MIMO system, and a coefficient for vertical spatial filtering corresponds to a received signal currently to be decoded among the n received signals, so that the initial sliced signal corresponds to the received signal currently to be decoded; receiving (n−1) initial sliced signals respectively corresponding to (n−1) received signals other than the received signal currently to be decoded among the n received signals, where each initial sliced signal is obtained by performing vertical spatial filtering on the n received signals and combining internal sub-signals for the n received signals after vertical spatial filtering, where a coefficient for each vertical spatial filtering corresponds to one of the (n−1) received signals other than the received signal currently to be decoded among the n received signals; generating (n−1) inter-channel interference ICI signals based on the (n−1) initial sliced signals respectively corresponding to the (n−1) received signals other than the received signal currently to be decoded among the n received signals; eliminating ICI from the n received signals based on the (n−1) ICI signals to obtain n ICI-eliminated signals; and performing vertical spatial filtering on and combining internal sub-signals for the n ICI-eliminated signals, to obtain a final sliced signal.

Another aspect of the present invention provides an equalizer, including: a first vertical filtering unit, configured to perform vertical spatial filtering on n received signals, where n is the total number of receive antennas in a multiple-input multiple-output MIMO system, and a coefficient for vertical spatial filtering corresponds to a received signal currently to be decoded among the n received signals; a first combining unit, configured to combine internal sub-signals for the n received signals after vertical spatial filtering, to obtain an initial sliced signal and output it to other (n−1) equalizers, where the initial sliced signal corresponds to the received signal currently to be decoded; an interference generating unit, configured to receive (n−1) initial sliced signals output by first combining units of the other (n−1) equalizers, where the (n−1) initial sliced signals respectively correspond to (n−1) received signals other than the received signal currently to be decoded among the n received signals, where each initial sliced signal is obtained by performing vertical spatial filtering on the n received signals and combining internal sub-signals for the n received signals after vertical spatial filtering, where a coefficient for each vertical spatial filtering corresponds to one of the (n−1) received signals other than the received signal currently to be decoded among the n received signals; and generate (n−1) inter-channel interference ICI signals based on the (n−1) initial sliced signals respectively corresponding to the (n−1) received signals other than the received signal currently to be decoded among the n received signals; an interference eliminating unit, configured to eliminate ICI from the n received signals based on the (n−1) ICI signals to obtain n ICI-eliminated signals; a second vertical filtering unit, configured to perform vertical spatial filtering on the n ICI-eliminated signals; and a second combining unit, configured to combine internal sub-signals for the n ICI-eliminated signals after vertical spatial filtering, to obtain a final sliced signal.

It can be seen from the foregoing summary that each equalizer first generates an initial sliced signal and altogether n initial sliced signals are generated; then generates (n−1) ICI signals based on initial sliced signals generated by (n−1) equalizers other than the current equalizer; and eliminates the generated (n−1) ICI signals from the n received signals, thereby eliminating the influence of ICI. Because a process of generating an interference is not affected by the singularity degree of the channel, this method can accurately eliminate ICI from both a microwave MIMO system with a sparse antenna array and a microwave MIMO system with a compact antenna array, thereby improving the effect of eliminating ICI from received signals.

BRIEF DESCRIPTION OF THE DRAWINGS

To illustrate the technical solutions in embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
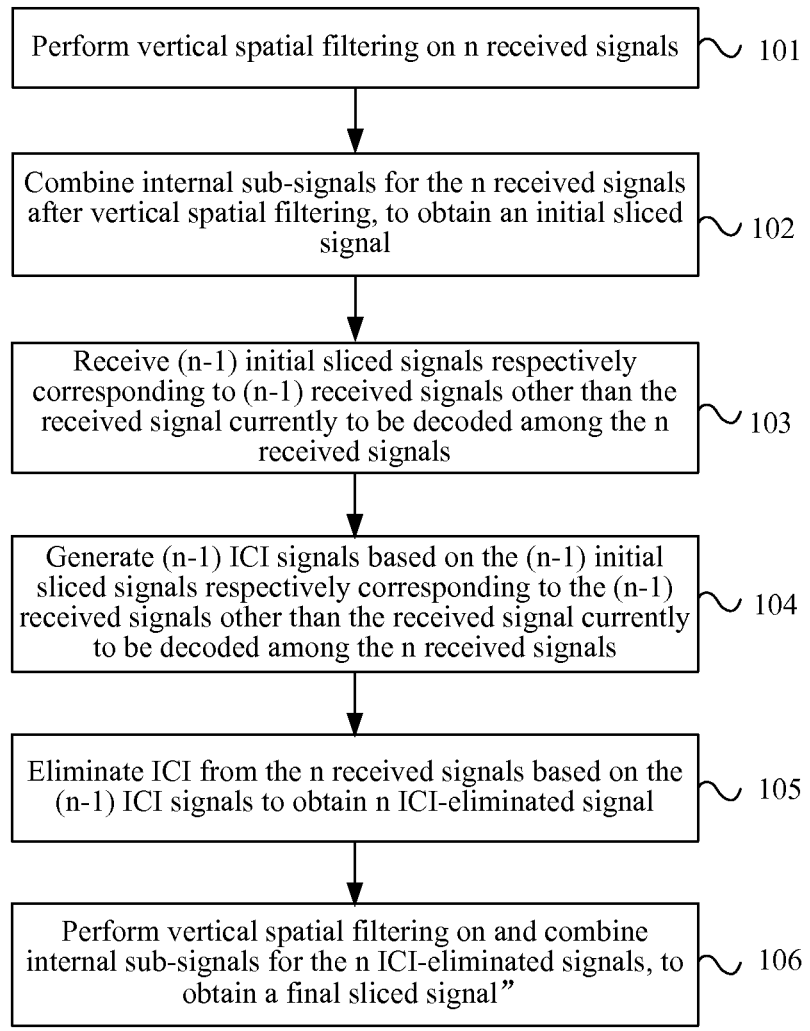
FIG. 1 is a flowchart of an equalization method for received signals in a MIMO system according to Embodiment 1 of the present invention.

The following clearly and completely describes the technical solutions in embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In a MIMO system, a typical transmission model can be expressed as R=H·S+N, in which S is a transmitted signal vector, R is a received signal vector, H is a MIMO channel matrix, and N is a noise vector. In a MIMO system, each received signal can be expressed as a combination of a useful signal, an interference signal, and noise, as shown in the following formula: $r_i = h_{ij}s_i + ICI_i + n_i$, in which $r_i$ is a signal received by an $i^{th}$ receive antenna, that is, an $i^{th}$ received signal; $h_{ij}$ is an element of the channel matrix H at a position (i, j), indicating a channel coefficient between a $j^{th}$ transmit antenna and the $i^{th}$ receive antenna; $s_i$ is a signal transmitted by an $i^{th}$ transmit antenna, that is, an $i^{th}$ transmitted signal; $ICI_i$ is $i^{th}$ and $n_i$ is noise of the $i^{th}$ receive antenna. Specifically, $$ICI_i = \sum_j h_{ij}s_j, \; j \neq i.$$

When a direct matrix inversion manner is used for decoding, a MIMO decoding model is shown in the following formula: S'=G·R=H$^{-1}$·(H·S+N), in which S' is a transmitted signal vector and G is a inverse channel matrix. While combining useful signals, a decoding operation implements a weighted offset on interference signals, as shown in the following formula:

$$s'_i = \sum_j g_{ij}(h_{ji}s_i + ICI_j + n_j),$$

in which $g_{ij}$ is a coefficient of the inverse channel matrix G at the position (i, j).

When the channel matrix H is a well-conditioned matrix, amplitude values of elements of the inverse matrix G are relatively evenly distributed and a weight coefficient g has a relatively high reliability. When a g-based weighting of combined signals is implemented in a matrix operation, greatly different amplification or attenuation effect does not occur, thereby relatively well balancing the energy of ICI and the energy of noise.

However, when singularity of the channel matrix H is serious, amplitude values of elements of the inverse matrix G are hugely different in distribution. In this case, a weight coefficient g has a relatively low reliability, creates a huge amplification effect on some combined signals in a weighted operation, and magnifies the impact of ICI and noise in decoded output signals, leading to severe deterioration of decoding performance.

If a similar ICI signal is constructed and eliminated from a data stream before an inverse operation, the ICI signal is expressed as $$ICI'_i = \sum_j (h_{ij}s_j - w_{ij}s_j) = \sum_j (h_{ij} - w_{ij})s_j = \sum_j h'_{ij}s_j, \; j \neq i,$$

in which $w_{ij}$ is an approximation generated by an interference generating filter to an actual interference channel $h_{ij}$. This manner reduces the impact of an interference signal on decoding on the one hand, while on the other hand equivalently decreases a matrix coefficient of an interference channel. As a result, correlation between a main channel and an interference channel is reduced, thereby reducing the singularity degree of a new channel matrix. This manner significantly enhances decoding performance.

Based on the foregoing principle, the present invention provides a slicing method and a slicing apparatus for received signals in a MIMO system. Details are described in Embodiment 1 to Embodiment 5 of the present invention. Slicing refers to determining a current signal as a certain signal in a specific set of signals and a determination is generally based on a minimum distance criteria. In the embodiments of the present invention, slicing refers to determining a current signal as a certain signal in a set of transmitted signals and using the current signal as a sliced signal. For example, a current signal may include an initial sliced signal and a final sliced signal in the following embodiments.

FIG. 1 is a flowchart of an equalization method for received signals in a MIMO system according to Embodiment 1 of the present invention. As shown in FIG. 1, the method includes the following process.

Step 101: Perform vertical spatial filtering on n received signals.

Step 102: Combine internal sub-signals for the n received signals after vertical spatial filtering, to obtain an initial sliced signal.

In step 101 and step 102, n is the total number of transmit antennas in the MIMO system. A coefficient for vertical spatial filtering corresponds to a received signal currently to be decoded among the n received signals, so that the initial sliced signal corresponds to the received signal currently to be decoded.

Step 103: Receive (n−1) initial sliced signals respectively corresponding to (n−1) received signals other than the received signal currently to be decoded among the n received signals.

In this step, each of the (n−1) initial sliced signals is obtained by performing vertical spatial filtering on the n received signals and combining internal sub-signals for the n received signals after vertical spatial filtering, where a coefficient for each vertical spatial filtering corresponds to one of the (n−1) received signals other than the received signal currently to be decoded among the n received signals.

Step 104: Generate (n−1) ICI signals based on the (n−1) initial sliced signals respectively corresponding to the (n−1) received signals other than the received signal currently to be decoded among the n received signals.

In this step, n equalizers may be respectively adopted, where each equalizer obtains an initial sliced signal in step 102. In step 103, a current equalizer obtains (n−1) initial sliced signals from other (n−1) equalizers. In step 104, (n−1) ICI signals are generated based on the (n−1) initial sliced signals.

Step 105: Eliminate ICI from the n received signals based on the (n−1) ICI signals to obtain n ICI-eliminated signals.

Step 106: Perform vertical spatial filtering on and combine internal sub-signals for the n ICI-eliminated signals, to obtain a final sliced signal.

In Embodiment 1 of the present invention, each equalizer first generates an initial sliced signal and altogether n initial sliced signals are generated; then generates (n−1) ICI signals based on initial sliced signals generated by (n−1) equalizers other than the current equalizer; and eliminates the generated (n−1) ICI signals from the n received signals, thereby eliminating the influence of ICI. Because a process of generating a channel is not affected by the singularity degree of the channel, the equalization method in Embodiment 1 of the present invention is applicable to both a microwave MIMO system with a sparse antenna array and a microwave MIMO system with a compact antenna array, and can accurately eliminate ICI from both a microwave MIMO system with a sparse antenna array and a microwave MIMO system with a compact antenna array, thereby improving the effect of eliminating ICI from received signals.

Based on the foregoing technical solution, a process of eliminating ICI and a process of eliminating ISI may be combined in Embodiment 1 of the present invention. Before vertical spatial filtering is performed on n received signals in step 101, transversal filtering is performed on the n received signals. Correspondingly, a process of performing vertical spatial filtering on n received signals as described in step 101 specifically is: performing vertical spatial filtering on n received signals after transversal filtering. Furthermore, a process of eliminating ICI from n received signals based on (n−1) ICI signals as described in step 103 specifically is: eliminating, based on (n−1) ICI signals, ICI from n received signals after transversal filtering. By performing transversal filtering on n received signals and performing an independent filter processing to each received signal, ISI is eliminated from each received signal separately. Then by adopting the method described in Embodiment 1 of the present invention, ICI is eliminated from n ISI-eliminated received signals, thereby completing a process of eliminating interference from the n received signals.

Figure 2:
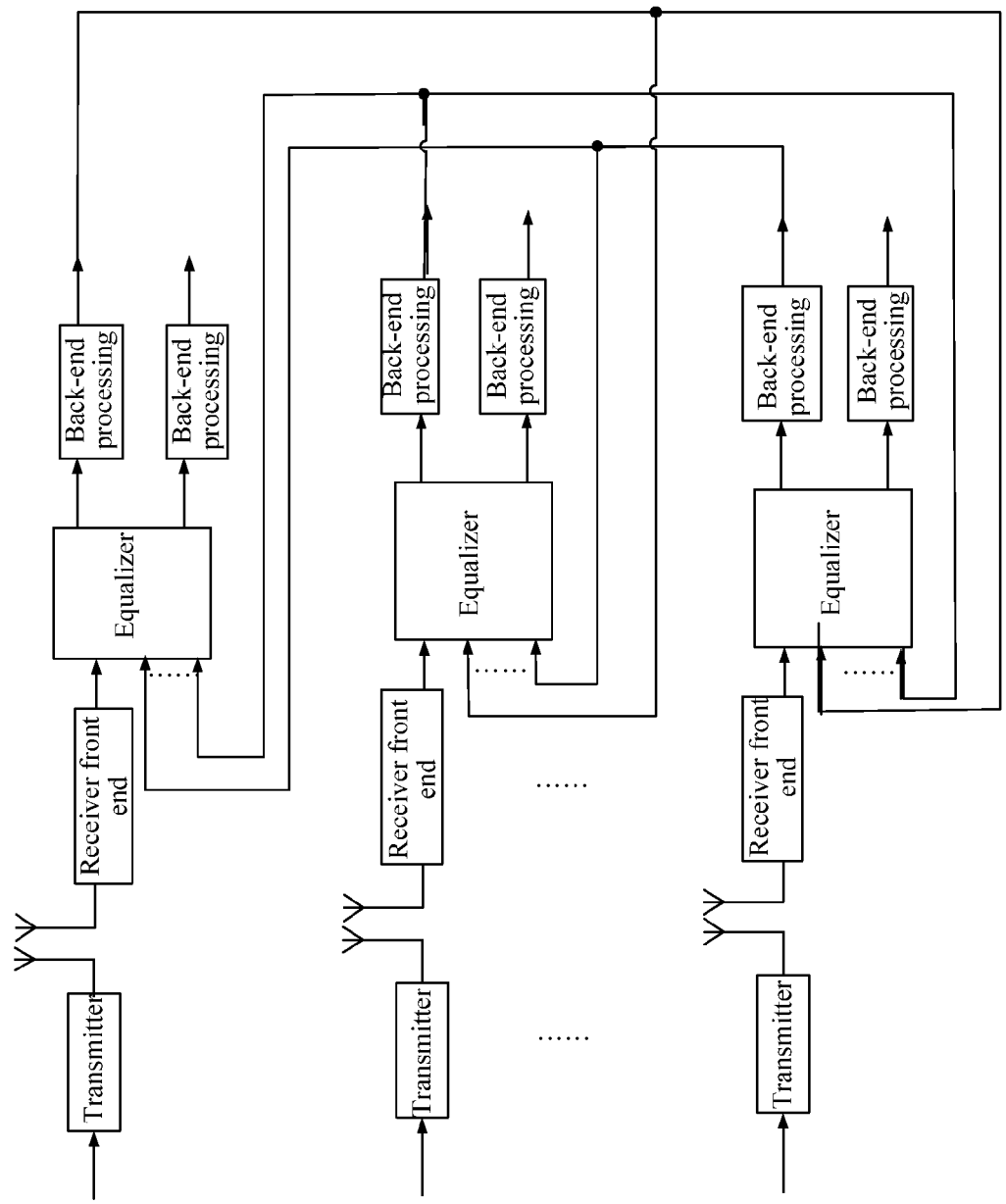
FIG. 2 is a schematic diagram of a location of an equalizer in a MIMO system according to Embodiment 1 to Embodiment 5 of the present invention.

In a practical application, an equalizer is configured to execute the equalization method in Embodiment 1 of the present invention. FIG. 2 is a schematic diagram of a location of an equalizer in a MIMO system according to Embodiment 1 to Embodiment 5 of the present invention. As shown in FIG. 2, an antenna connected to a transmitter is a transmit antenna, and an antenna connected to a receiver front end is a receive antenna. A MIMO system includes n transmit antennas and n receive antennas, where each receive antenna receives signals transmitted by the n transmit antennas, that is, each receive antenna receives n received signals. Referring to FIG. 2, this system is configured with a total of n identical equalizers, where each receive antenna is configured with an equalizer, and each equalizer is configured with a unique transversal filtering coefficient and a unique vertical spatial filtering coefficient. The coefficients of each equalizer correspond to one of the n received signals, so that an initial sliced signal output by each equalizer corresponds to a received signal and initial sliced signals output by n equalizers respectively correspond to the n received signals. Each equalizer executes the equalization method in Embodiment 1 of the present invention. Further, each equalizer may also execute an equalization method in Embodiment 2 of the present invention.

Figure 3:
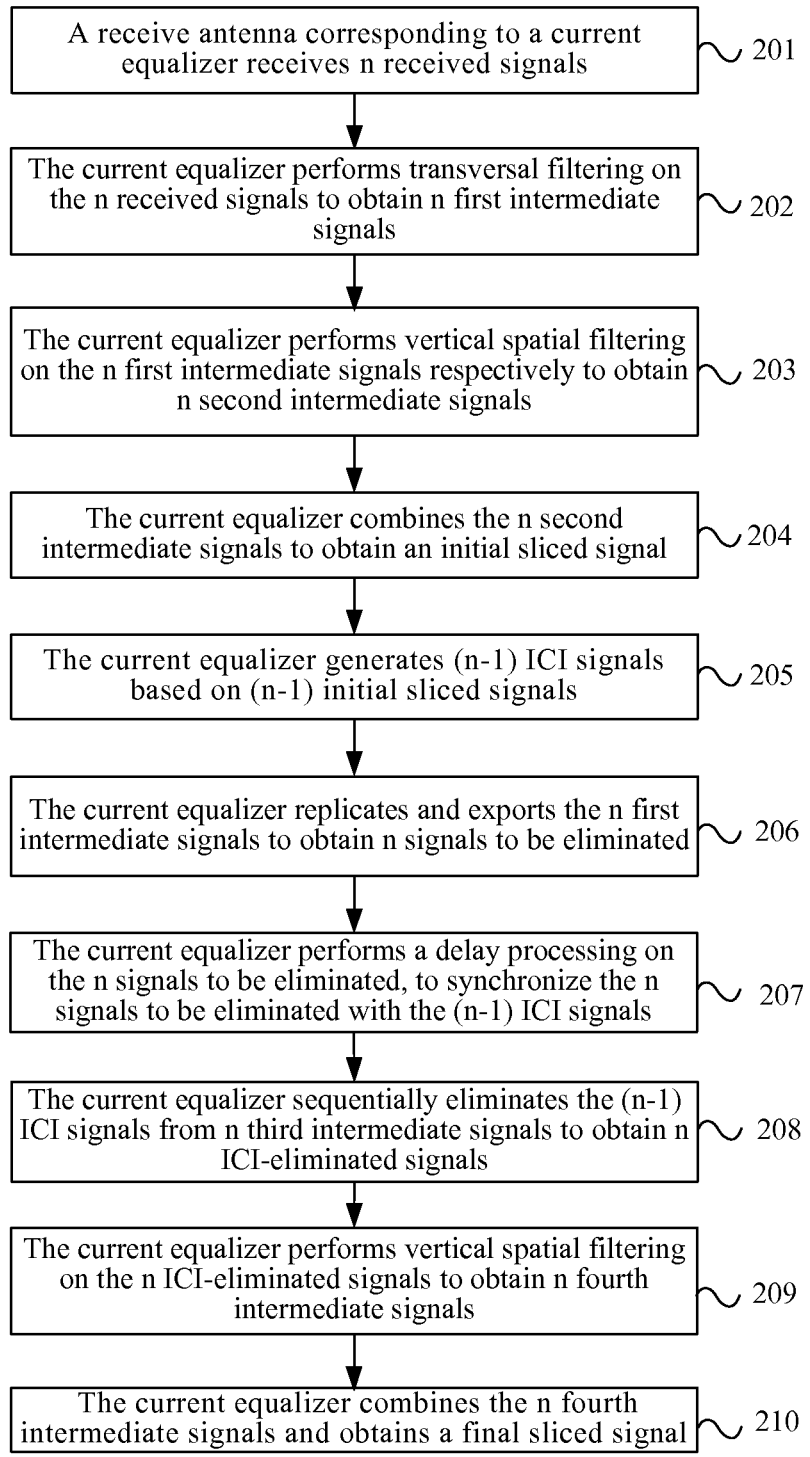
FIG. 3 is a flowchart of an equalization method for received signals in a MIMO system according to Embodiment 2 of the present invention.

FIG. 3 is a flowchart of an equalization method for received signals in a MIMO system according to Embodiment 2 of the present invention. In Embodiment 2 of the present invention, n equalizers are configured for a system, in which each equalizer executes the following step 201 to step 210. In description of step 201 to step 210 of Embodiment 2 of the present invention, one equalizer is taken as an executor for description and known as a current equalizer, and an execution method of other equalizers is the same as an execution method of the current equalizer and is not detailed in Embodiment 2 of the present invention.

Step 201: A receive antenna corresponding to a current equalizer receives n received signals.

In this step, the current equalizer corresponds to a receive antenna, which receives signals transmitted by n transmit antennas. Each transmit antenna transmits a signal and the receive antenna corresponding to the current equalizer receives a total of n received signals.

Step 202: The current equalizer performs transversal filtering on the n received signals to obtain n first intermediate signals.

In this step, the current equalizer performs transversal filtering on the n received signal respectively to obtain a corresponding first intermediate signal, and altogether n first intermediate signals are obtained; and ISI compensation is achieved through transversal filtering. Specifically, transversal filtering process may adopt a transversal filter, which performs a weighted structuring on crosstalk information spread by a code word into adjacent code words, and obtains an ISI-eliminated output signal after processing a length of consecutive input signals, thereby compensating for the impact caused by ISI.

Step 203: The current equalizer performs vertical spatial filtering on the n first intermediate signals respectively to obtain n second intermediate signals.

In this step, for the n first intermediate signals, the current equalizer performs a cross filtering on the n first intermediate signals through vertical spatial filtering process to obtain a second intermediate signal corresponding to each first intermediate signal, and altogether n second intermediate signals are obtained. In vertical spatial filtering, ICI inversion and decoding are achieved through approximation of a filtering coefficient to an inverse matrix coefficient.

Step 204: The current equalizer combines the n second intermediate signals to obtain an initial sliced signal.

In this step, the current equalizer combines the n second intermediate signals to obtain an initial sliced signal. After an initial sliced signal is obtained, a back-end processing may be further performed on the initial sliced signal. The back-end processing mainly compensates for other losses possibly existing in an actual system, such as IQ imbalance and phase noise. An initial sliced signal mentioned in any of the following steps is an initial sliced signal after a back-end processing.

In Embodiment 2 of the present invention, n equalizers are configured for a system, in which each equalizer executes the foregoing step 201 to step 204 to obtain an initial sliced signal, and the n equalizers altogether obtains n initial sliced signals. The current equalizer receives (n−1) initial sliced signals respectively corresponding to (n−1) received signals other than a received signal currently to be decoded among the n received signals, where each initial sliced signal is obtained by performing vertical spatial filtering on the n received signals and combining internal sub-signals for the n received signals after vertical spatial filtering, where a coefficient for each vertical spatial filtering corresponds to one of the (n−1) received signals other than the received signal currently to be decoded among the n received signals.

Step 205: The current equalizer generates (n−1) ICI signals based on the (n−1) initial sliced signals.

In this step, the current equalizer generates (n−1) ICI signals based on the (n−1) initial sliced signals generated by other (n−1) equalizers, where the (n−1) initial sliced signals correspond to the (n−1) received signals other than the received signal currently to be decoded among the n received signals.

Step 206: The current equalizer replicates and extracts the n first intermediate signals to obtain n signals to be eliminated.

In this step, the n first intermediate signals obtained through transversal filtering in step 202 are replicated and extracted, and n signals to be eliminated are obtained.

Step 207: The current equalizer performs a delay processing on the n signals to be eliminated, to synchronize the n signals to be eliminated with the (n−1) ICI signals.

In this step, a delay processing is performed on the n signals to be eliminated, to synchronize the n signals to be eliminated with the (n−1) ICI signals generated in step 205. A signal to be eliminated that has undergone the delay processing in step 207 is known as a third intermediate signal.

Step 208: The current equalizer sequentially eliminates the (n−1) ICI signals from n third intermediate signals to obtain n ICI-eliminated signals.

In this step, the current equalizer achieves an objective of eliminating ICI from the n received signals based on the (n−1) ICI signals by sequentially eliminating the (n−1) ICI signals from the n third intermediate signals, to obtain n ICI-eliminated signals. Elimination of ICI signals is mainly completed in (n−1) interference eliminating subunits. An ICI signal is input into each interference eliminating subunit, in which the input ICI signal is multiplied by n weight coefficients in parallel, and n weighted signals are obtained. Each weighted signal corresponds to a third intermediate signal. When interference of an ICI signal is eliminated, n weighted signals and their corresponding third intermediate signals are inversely combined, thereby eliminating the ICI signal corresponding to the interference eliminating subunit from a signal output by the interference eliminating subunit. Each interference eliminating subunit adopts the foregoing manner, where n third intermediate signals sequentially passes through (n−1) interference eliminating subunits, thereby sequentially eliminating (n−1) ICI signals. A weight coefficient is obtained mainly by using two methods: one is to obtain, through estimation by using information such as signaling and pilot in a data transmission stream, a weight coefficient required by interference elimination; and the other is to self-adaptively update a weight coefficient by using an error feedback obtained from decoding and slicing. Further, the foregoing two methods can be used together: obtaining an initial value of a weight coefficient through estimation and then updating and fine-tuning the weight coefficient by using a feedback.

Step 209: The current equalizer performs vertical spatial filtering on the n ICI-eliminated signals to obtain n fourth intermediate signals.

In this step, vertical spatial filtering is performed on the n ICI-eliminated signals to achieve ICI inversion and decoding, to obtain fourth intermediate signals.

Step 210: The current equalizer combines the n fourth intermediate signals to obtain a final sliced signal.

In the foregoing technical solution, the performing transversal filtering on n received signals and the generating (n−1) ICI signals are processed accordingly in the time domain. That is, transversal filtering is performed on the n received signals in the time domain, and (n−1) ICI signals are generated in the time domain.

Further, based on the foregoing technical solution, the foregoing processings may be performed in the frequency domain. That is, transversal filtering is performed on the n received signals in the frequency domain, and (n−1) ICI signals are generated in the frequency domain. Correspondingly, to adapt to the foregoing processings in the frequency domain, the following steps need to be added into a foregoing process.

Before step 202, add step one: The current equalizer performs a Fast Fourier Transform (FFT) on the n received signals to obtain n frequency-domain received signals.

Correspondingly, transversal filtering is performed on the n frequency-domain received signals in the frequency domain in step 202. After step 203, second intermediate signals in the frequency domain are obtained.

After step 203, add step two: The current equalizer performs an Inverse Fast Fourier Transform (Inverse Fast Fourier Transform, briefly referred to as IFFT) on the received signals after vertical spatial filtering. By performing an IFFT on the n second intermediate signals obtained in step 203, the n second intermediate signals are converted from frequency-domain signals to time-domain signals. Correspondingly, the n second intermediate signals are combined in the time domain in step 204.

After step 204, add step three: The current equalizer performs an FFT on the (n−1) initial sliced signals from the other (n−1) equalizers to obtain (n−1) frequency-domain initial sliced signals. Correspondingly, in step 205, the current equalizer generates (n−1) ICI signals in the frequency domain based on the (n−1) frequency-domain initial sliced signals.

Correspondingly, step 206 to step 209 are performed in the frequency domain.

After step 209, add step four: The current equalizer performs an IFFT on the n ICI-eliminated signals after vertical spatial filtering, and converts the n ICI-eliminated signals from frequency-domain signals to time-domain signals. In step 210, sub-signals corresponding to the n fourth intermediate signals are combined in the time domain.

In Embodiment 2 of the present invention, (n−1) ICI signals are generated based on initial sliced signals generated by other (n−1) equalizers other than a current equalizer, and the generated (n−1) ICI signals are eliminated from n received signals of the current equalizer, thereby eliminating the influence of ICI. Because a process of generating a channel is not affected by the singularity degree of the channel, the equalization method in Embodiment 2 of the present invention is applicable to both a microwave MIMO system with a sparse antenna array and a microwave MIMO system with a compact antenna array, and can accurately eliminate ICI from both a microwave MIMO system with a sparse antenna array and a microwave MIMO system with a compact antenna array, thereby improving the effect of eliminating ICI from received signals and enhancing transmission performance of the microwave MIMO system. Moreover, by performing FFTs or IFFTs on received signals and initial sliced signals, the equalization method can be applied to both the time domain and the frequency domain, thereby conveniently and flexibly applicable to various application scenarios.

Figure 4:
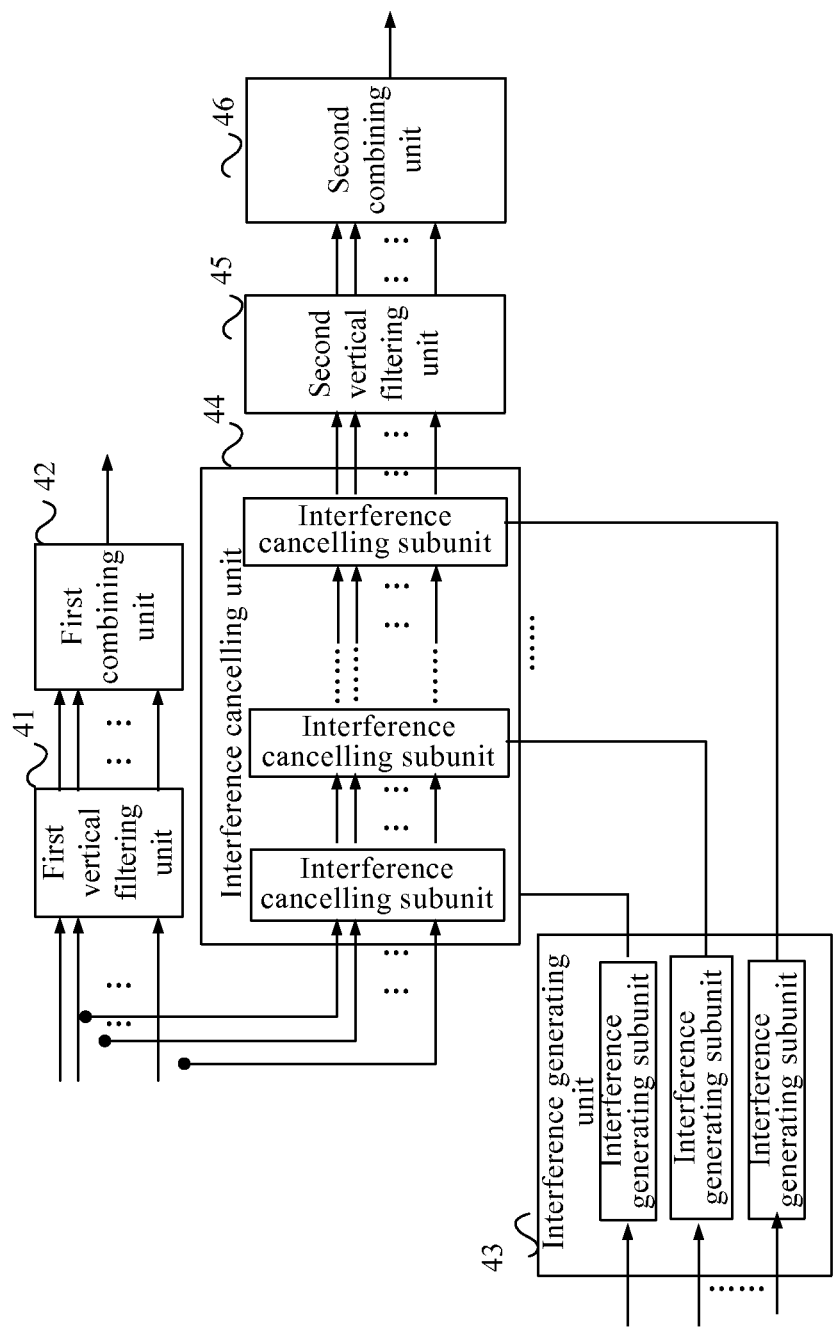
FIG. 4 is a schematic structural diagram of an equalizer according to Embodiment 3 of the present invention.

FIG. 4 is a schematic structural diagram of an equalizer according to Embodiment 3 of the present invention. In the MIMO system shown in FIG. 2, each equalizer adopts an equalization method shown in FIG. 1 or FIG. 3. Specifically, an internal structure of each equalizer may be shown in FIG. 4.

Referring to FIG. 4, an equalizer at least includes a first vertical filtering unit 41, a first combining unit 42, an interference generating unit 43, an interference eliminating unit 44, a second vertical filtering unit 45, and a second combining unit 46.

The first vertical filtering unit 41 is configured to perform vertical spatial filtering on n received signals, where n is the total number of receive antennas in the MIMO system, and a coefficient for vertical spatial filtering corresponds to a received signal currently to be decoded among the n received signals.

The first combining unit 42 is configured to combine internal sub-signals for the n received signals after vertical spatial filtering, to obtain an initial sliced signal and output it to other (n−1) equalizers, where the initial sliced signal corresponds to the received signal currently to be decoded.

The interference generating unit 43 is configured to receive (n−1) initial sliced signals output by first combining units 42 of other (n−1) equalizers, and generates (n−1) ICI signals based on the (n−1) initial sliced signals corresponding to (n−1) received signals other than the received signal currently to be decoded among the n received signals. The foregoing (n−1) initial sliced signals respectively correspond to the (n−1) received signals other than the received signal currently to be decoded among the n received signals, where each initial sliced signal is obtained by performing vertical spatial filtering on the n received signals and combining internal sub-signals for the n received signals after vertical spatial filtering, where a coefficient for each vertical spatial filtering corresponds to one of the (n−1) received signals other than the received signal currently to be decoded among the n received signals. Specifically, the interference generating unit 43 may include (n−1) interference generating subunits, where each interference generating subunit generates an ICI signal based on an initial sliced signal output by the first combining unit 42 of another equalizer.

The interference eliminating unit 44 is configured to eliminate ICI from the n received signals based on the (n−1) ICI signals to obtain n ICI-eliminated signals. Specifically, the interference eliminating unit 44 may include (n−1) interference eliminating subunits, where each interference eliminating subunit receives an ICI signal generated by an interference generating subunit. The (n−1) interference eliminating subunits are connected in series, where the first serial-connected interference eliminating subunit receives n received signals after transversal filtering. Each interference eliminating subunit eliminates an ICI signal that is generated by an interference generating subunit connected to itself from the n received signals received by itself, and transmits an ICI-eliminated signal to a next interference eliminating subunit. After eliminating an ICI signal, the last serial-connected interference eliminating subunit obtains n ICI-eliminated signals and sends the n ICI-eliminated signals to the second vertical filtering unit 45.

The second vertical filtering unit 45 is configured to perform vertical spatial filtering on the n ICI-eliminated signals.

The second combining unit 46 is configured to combine internal sub-signals for the n ICI-eliminated signals after vertical spatial filtering, to obtain a final sliced signal.

In Embodiment 3 of the present invention, each equalizer uses its first vertical filtering unit and its first combining unit to generate an initial sliced signal, and altogether n initial sliced signals are generated. The interference generating unit of a current equalizer generates (n−1) ICI signals based on initial sliced signals generated by (n−1) equalizers other than the current equalizer, and an interference eliminating unit eliminates the generated (n−1) ICI signals from the n received signals, thereby eliminating the influence of ICI. Because a process of generating a channel is not affected by the singularity degree of the channel, the equalizer in Embodiment 3 of the present invention is applicable to both a microwave MIMO system with a sparse antenna array and a microwave MIMO system with a compact antenna array, and can accurately eliminate ICI from both a microwave MIMO system with a sparse antenna array and a microwave MIMO system with a compact antenna array, thereby improving the effect of eliminating ICI from received signals.

Based on the foregoing technical solution, further in Embodiment 3 of the present invention, the foregoing structure for eliminating ICI and the foregoing structure for eliminating ISI may be combined. In this case, an equalizer further includes transversal filtering unit, besides the first vertical filtering unit 41, the first combining unit 42, the interference generating unit 43, the interference eliminating unit 44, the second vertical filtering unit 45, and the second combining unit 46. The transversal filtering unit, connected before the first vertical filtering unit 41, is configured to perform transversal filtering on n received signals. Correspondingly, the first vertical filtering unit 41 is specifically configured to perform vertical spatial filtering on the n received signals after transversal filtering that are output by the transversal filtering unit. The interference eliminating unit 44 is specifically configured to eliminate, based on (n−1) ICI signals, ICI from the n received signals after transversal filtering that are output by the transversal filtering unit, to obtain n ICI-eliminated signals.

Figure 5:
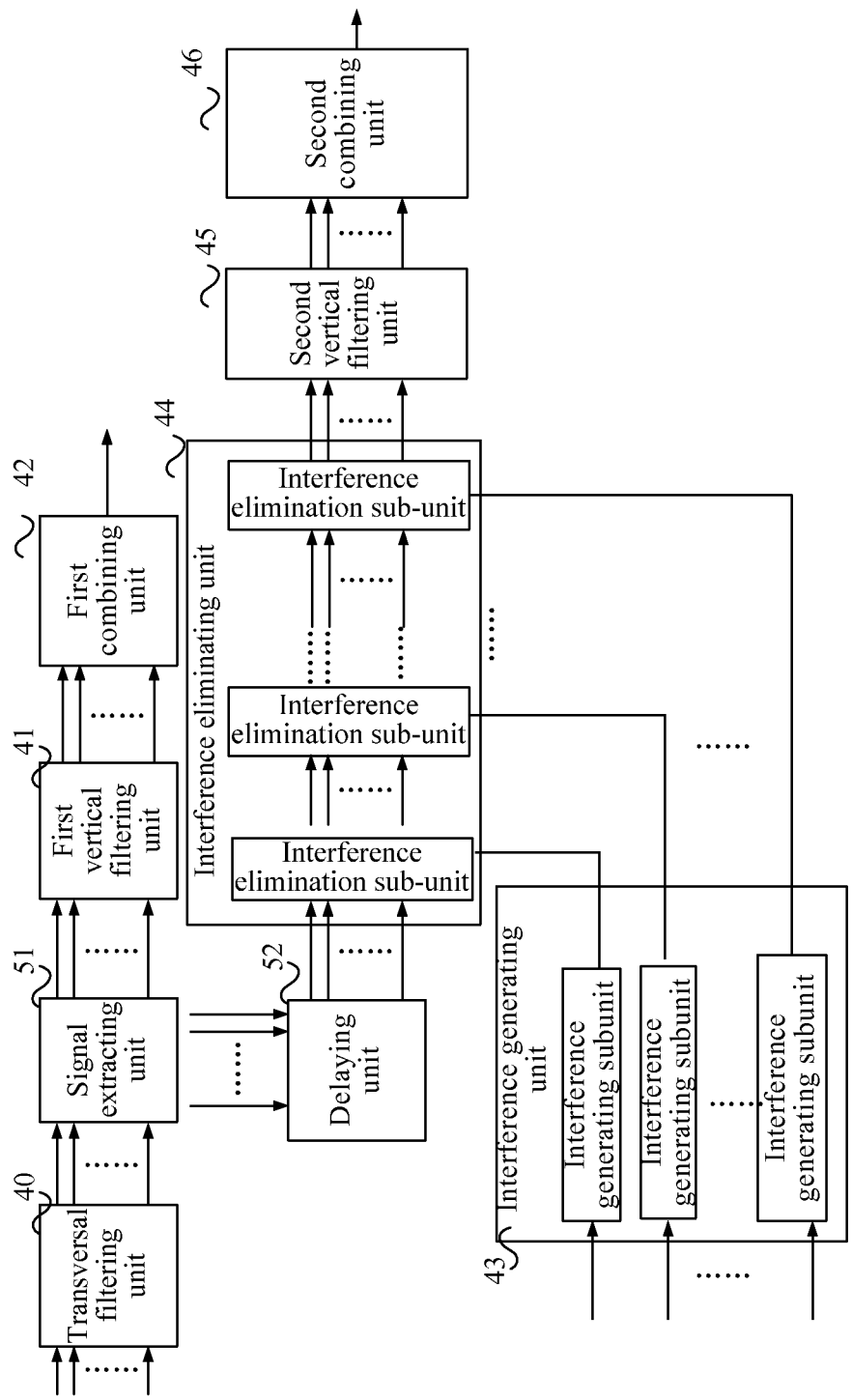
FIG. 5 is a schematic structural diagram of an equalizer according to Embodiment 4 of the present invention.

FIG. 5 is a schematic structural diagram of an equalizer according to Embodiment 4 of the present invention. As shown in FIG. 5, an equalizer not only includes a transversal filtering unit 40, a first vertical filtering unit 41, a first combining unit 42, an interference generating unit 43, an interference eliminating unit 44, a second vertical filtering unit 45, and a second combining unit 46, but also includes a signal extracting unit 51 and a delaying unit 52.

The transversal filtering unit 40, the first vertical filtering unit 41, the first combining unit 42, the interference generating unit 43, the interference eliminating unit 44, the second vertical filtering unit 45, and the second combining unit 46 have the functions described in Embodiment 3 of the present invention.

Based on the foregoing, further, the signal extracting unit 51 is connected to the transversal filtering unit 40 and the delaying unit 52, and is configured to replicate and extract the n received signals after transversal filtering, to obtain n signals to be eliminated. The signal extracting unit 51 has a branching function. Signals that have passed through the transversal filtering unit 40 are input into the signal extracting unit 51, which outputs two channels of signals identical to the input signals, where one channel of signals is output to the first vertical filtering unit 41, and the other channel of signals is output to the delaying unit 52. As signals to be eliminated, the other channel of signals specifically includes n signals. The delaying unit 52 is configured to perform a delay processing on the n signals to be eliminated, to synchronize the n signals to be eliminated with the (n−1) ICI signals. The interference eliminating unit 44 is specifically configured to eliminate the (n−1) ICI signals from the n signals to be eliminated after the delay processing, to obtain n ICI-eliminated signals. Specifically, the first serial-connected interference eliminating subunit in the interference eliminating unit 44 is connected to the delaying unit 52 and receives the n received signals after transversal filtering that are transmitted by the delaying unit 52.

In Embodiment 4 of the present invention, after transversal filtering is performed on n received signals, processings by the first vertical filtering unit, the first combining unit, and the interference generating unit take some time, and signal transmission between the foregoing units also takes some time, causing a time difference between the generated ICI signals and the n received signals after transversal filtering. In the solution of Embodiment 4 of the present invention, the delaying unit delays n received signals after transversal filtering to such an extent that the n received signals are synchronized with generated ICI signals. This ensures synchronization between the n received signals input into the interference eliminating unit and the (n−1) ICI signals, thereby further improving the accuracy of eliminating ICI, and further enhancing the effect of eliminating ICI from received signals and transmission performance of a microwave MIMO system.

In Embodiment 3 of the present invention and Embodiment 4 of the present invention, an equalizer performs a processing in the time domain. Specifically, a transversal filtering unit 40 in the foregoing equalizer is specifically configured to perform transversal filtering on n received signals in the time domain, and an interference generating unit 43 in the foregoing equalizer is specifically configured to generate (n−1) ICI signals in the time domain. When an equalizer performs a processing in the time domain, the transversal filtering unit 40 may adopt a set of finite impulse response (Finite Impulse Response, briefly referred to as FIR) filters, and the interference generating unit 43 may include (n−1) subunits, each of which generates an ICI signal based on an initial sliced signal of another equalizer, and may also adopt a set of FIR filters.

Based on the technical solutions in Embodiment 3 of the present invention and Embodiment 4 of the present invention, the equalizer may further perform a processing in the frequency domain, and accordingly, needs to further include some FFT units and IFFT units. The following introduces an internal structure of an equalizer that performs a processing in the frequency domain according to Embodiment 5 of the present invention.

Figure 6:
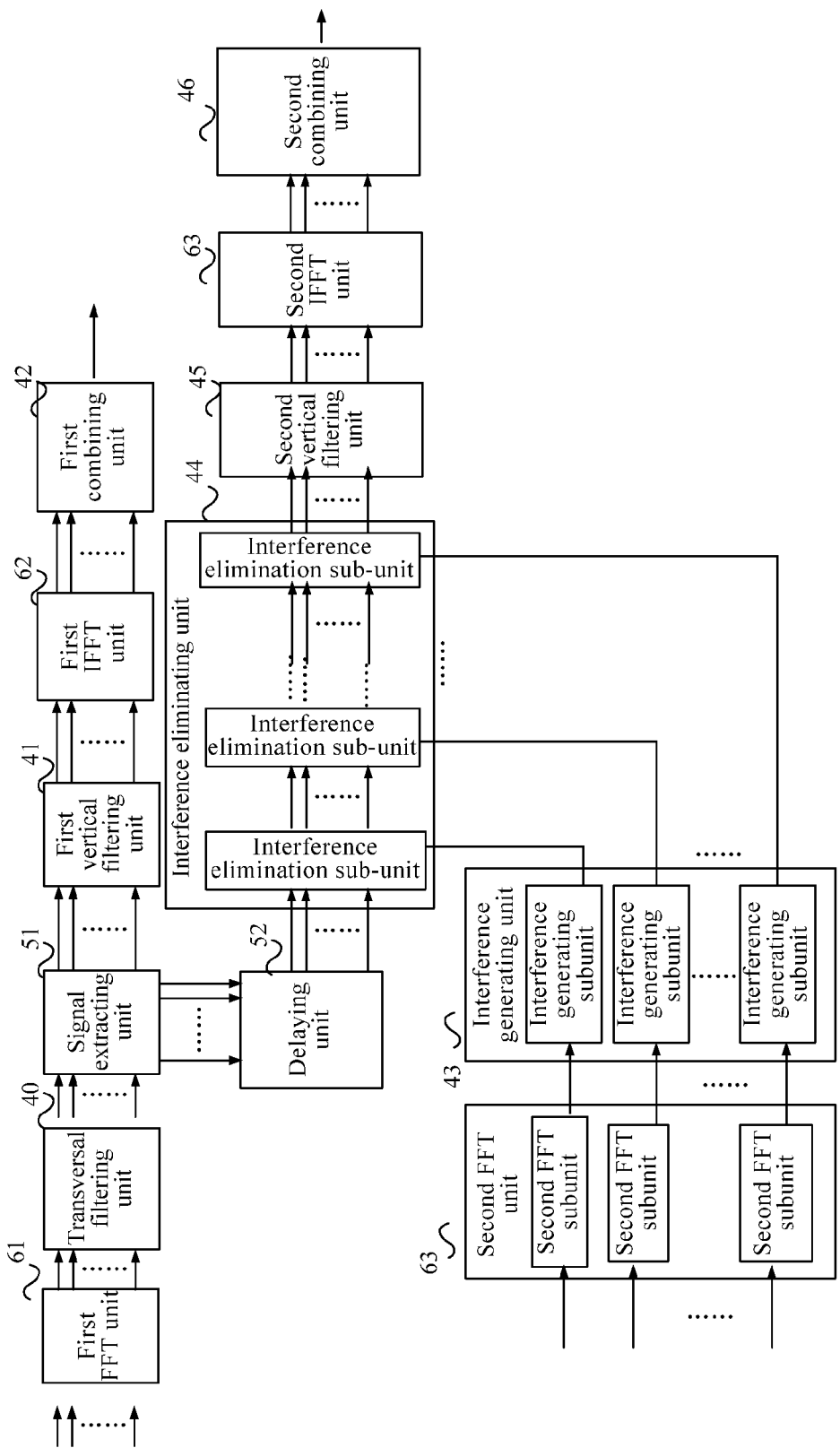
FIG. 6 is a schematic structural diagram of an equalizer according to Embodiment 5 of the present invention.

FIG. 6 is a schematic structural diagram of an equalizer according to Embodiment 5 of the present invention. As shown in FIG. 6, the equalizer may further include a first FFT unit 61, a second FFT unit 63, a first IFFT unit 62, and a second IFFT unit 64 based on an internal composition structure of the equalizer in Embodiment 3 of the present invention as shown in FIG. 4, and may further include a first FFT unit 61, a second FFT unit 63, a first IFFT unit 62, and a second IFFT unit 64 based on an internal composition structure of the equalizer in Embodiment 4 of the present invention as shown in FIG. 5. In Embodiment 5 of the present invention, the equalizer according to Embodiment 5 of the present invention is introduced only based on an internal composition structure of the equalizer in Embodiment 4 of the present invention.

As shown in FIG. 6, the equalizer not only includes a transversal filtering unit 40, a first vertical filtering unit 41, a first combining unit 42, an interference generating unit 43, an interference eliminating unit 44, a second vertical filtering unit 45, a second combining unit 46, a signal extracting unit 51, and a delaying unit 52, but also includes a first FFT unit 61, a second FFT unit 63, a first IFFT unit 62, and a second IFFT unit 64.

The transversal filtering unit 40, the first vertical filtering unit 41, the interference generating unit 43, the interference eliminating unit 44, the second vertical filtering unit 45, the signal extracting unit 51, and the delaying unit 52 work in the frequency domain and implements the functions described in Embodiment 4 of the present invention in the frequency domain. The first combining unit 42 and the second combining unit 46 work in the time domain.

Specifically, the first FFT unit 61, connected to the transversal filtering unit 40, is configured to perform an FFT on n received signals, convert the n received signals from time-domain signals to frequency-domain signals, to obtain n frequency-domain received signals.

The transversal filtering unit 40 is specifically configured to perform transversal filtering on the n frequency-domain received signals in the frequency domain.

The first vertical filtering unit 41 is specifically configured to perform vertical spatial filtering on the n frequency-domain received signals after transversal filtering.

The first IFFT unit 62, connected to the first vertical filtering unit 41 and the first combining unit 42, is configured to perform an IFFT on the n frequency-domain received signals after vertical spatial filtering, and convert the n received signals from frequency-domain signals to time-domain signals.

The first combining unit 42 is configured to combine internal sub-signals for the n time-domain received signals after vertical spatial filtering that are output by the IFFT unit, obtain an initial sliced signal, and output the initial sliced signal to other (n−1) equalizers.

The second FFT unit 63, connected to first combining units 42 of the other (n−1) equalizers and the interference generating unit 43, is configured to perform an FFT on (n−1) initial sliced signals, convert the (n−1) initial sliced signals from time-domain signals to frequency-domain signals, to obtain (n−1) frequency-domain initial sliced signals. Specifically, the second FFT unit 63 may include (n−1) second FFT subunits, each of which, connected to a first combining unit 42 of another equalizer and an interference generating subunit of the current equalizer, performs an FFT on an initial sliced signal generated by the another equalizer connected to itself and outputs an FFT result to the interference generating subunit connected to itself.

The interference generating unit 43 is specifically configured to generate (n−1) ICI signals in the frequency domain based on the (n−1) frequency-domain initial sliced signals.

The signal extracting unit 51, connected to the transversal filtering unit 40 and the delaying unit 52, is configured to replicate and extract n frequency-domain received signals after transversal filtering, to obtain n frequency-domain signals to be eliminated.

The delaying unit 52 is configured to perform a delay processing on the n frequency-domain signals to be eliminated, to synchronize the n frequency-domain signals to be eliminated with the (n−1) frequency-domain ICI signals.

The interference eliminating unit 44 is specifically configured to eliminate the (n−1) frequency-domain ICI signals from the n frequency-domain signals to be eliminated after the delay processing, to obtain n frequency-domain ICI-eliminated signals.

The second vertical filtering unit 45 is configured to perform vertical spatial filtering on the n frequency-domain ICI-eliminated signals.

The second IFFT unit 64, connected to the second vertical filtering unit 45 and the second combining unit 46, is configured to perform an IFFT on the n frequency-domain ICI-eliminated signals after vertical spatial filtering, and convert the n ICI-eliminated signals from frequency-domain signals to time-domain signals.

The second combining unit 46 is configured to combine internal sub-signals for the n time-domain ICI-eliminated signals after vertical spatial filtering that are output by the second IFFT unit 64, to obtain a final sliced signal.

When an equalizer performs a processing in the frequency domain, a transversal filtering unit 40 in the equalizer may adopt a frequency domain equalizer (FDE), and the interference generating unit 43 in the equalizer may include (n−1) subunits, each of which generates an ICI signal based on an initial sliced signal of another equalizer, and may also adopt an FDE.

In Embodiment 5 of the present invention, an equalizer may be used in the frequency domain by adding the first FFT unit, the second FFT unit, the first IFFT unit, and the second IFFT unit and by performing FFTs or IFFTs on received signals and initial sliced signals. The equalizer may be used in the time domain without the first FFT unit, the second FFT unit, the first IFFT unit, and the second IFFT unit. Therefore, the equalizer can be conveniently and flexibly applied in various application scenarios.

In Embodiment 3 to Embodiment 5 of the present invention, a system includes n equalizers, where a transversal filtering unit 40 of each equalizer is configured with a unique transversal filtering coefficient, a first vertical filtering unit 41 of each equalizer is configured with a unique vertical spatial filtering coefficient, and a second vertical filtering unit 45 of each equalizer is configured with a unique vertical spatial filtering coefficient. The foregoing coefficients of each equalizer correspond to one of the n received signals, so that an initial sliced signal output by each equalizer corresponds to a received signal and initial sliced signals output by n equalizers respectively correspond to the n received signals. In a practical application, the coefficients can be self-adaptively adjusted by an executing component such as a transversal filtering unit 40, a first vertical filtering unit 41, and a second vertical filtering unit 45.

It should be noted that, for brevity, the foregoing method embodiments are represented as a series of actions. However, persons skilled in the art should understand that the present invention is not limited to the order of the described actions, because according to the present invention, some steps may be performed in another order or simultaneously. It should be further understood by persons skilled in the art that the described embodiments in the specification all belong to exemplary embodiments, and the involved actions and modules are not necessarily required by the present invention.

In the foregoing embodiments, the description of each embodiment has respective focuses. For a part that is not described in detail in a certain embodiment, reference may be made to related descriptions in other embodiments.

Persons of ordinary skill in the art may understand that all or a part of the steps of the methods in the embodiments may be implemented by a program instructing relevant hardware. The program may be stored in a computer readable storage medium. When the program is run, the steps of the methods in the embodiments are performed. The storage medium may include any medium that can store program code, such as a ROM, a RAM, a magnetic disk, or an optical disk.

Finally, it should be noted that the foregoing descriptions are merely used to describe the embodiments of the present invention, but are not intended to limit the protection scope of the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the scope of the technical solutions of the embodiments of the present invention.

What is claimed is:

1. An equalization method for received signals in a multiple-input multiple-output (MIMO) system, the method comprising:
   performing vertical spatial filtering on n received signals, wherein n is a total number of transmit antennas in the MIMO system;
   combining internal sub-signals for the n received signals after vertical spatial filtering, to obtain an initial sliced signal and a coefficient for vertical spatial filtering corresponds to a received signal currently to be decoded among the n received signals, so that the initial sliced signal corresponds to the received signal currently to be decoded;
   receiving (n−1) initial sliced signals respectively corresponding to (n−1) received signals other than the received signal currently to be decoded among the n received signals, wherein each initial sliced signal is obtained by performing vertical spatial filtering on the n received signals;
   combining internal sub-signals for the n received signals after vertical spatial filtering, wherein a coefficient for each vertical spatial filtering corresponds to one of the (n−1) received signals other than the received signal currently to be decoded among the n received signals;
   generating (n−1) inter-channel interference ICI signals based on the (n−1) initial sliced signals respectively corresponding to the (n−1) received signals other than the received signal currently to be decoded among the n received signals;
   eliminating ICI from the n received signals based on the (n−1) ICI signals to obtain n ICI-eliminated signals; and
   performing vertical spatial filtering on and combining internal sub-signals for the n ICI-eliminated signals, to obtain a final sliced signal.

2. The method according to claim 1, wherein, before performing the vertical spatial filtering on the n received signals and before eliminating ICI from the n received signals, the method further comprises performing transversal filtering on the n received signals;
   wherein performing the vertical spatial filtering on the n received signals comprises performing vertical spatial filtering on the n received signals after transversal filtering; and wherein eliminating ICI from the n received signals based on the (n−1) ICI signals comprises eliminating, based on the (n−1) ICI signals, ICI from the n received signals after transversal filtering.

3. The method according to claim 2, wherein, after performing the transversal filtering on the n received signals, the method further comprises replicating and extracting the n received signals after transversal filtering, to obtain n signals to be eliminated; and wherein eliminating ICI from the n received signals after transversal filtering comprises performing a delay processing on the n signals to be eliminated, to synchronize the n signals to be eliminated with the (n−1) ICI signals and eliminating the (n−1) ICI signals from the n signals to be eliminated after the delay processing.

4. The method according to claim 3, wherein performing the transversal filtering on the n received signals comprises: performing transversal filtering on the n received signals in the time domain; and wherein generating the (n−1) ICI signals comprises generating the (n−1) ICI signals in the time domain.

5. The method according to claim 3, wherein, before performing the transversal filtering on the n received signals, the method further comprises performing a Fast Fourier Transform (FFT) on the n received signals to obtain n frequency-domain received signals;

wherein performing transversal filtering on the n received signals comprises performing transversal filtering on the n frequency-domain received signals in the frequency domain;

wherein, after the performing vertical spatial filtering on n received signals, the method further comprises performing an Inverse Fast Fourier Transform (IFFT) on the n received signals after vertical spatial filtering;

wherein, before generating the (n−1) ICI signals, the method further comprises performing an FFT on the (n−1) initial sliced signals to obtain (n−1) frequency-domain initial sliced signals;

wherein, generating the (n−1) ICI signals comprises generating (n−1) ICI signals in the frequency domain based on the (n−1) frequency-domain initial sliced signals; and wherein, after performing the vertical spatial filtering on the n ICI-eliminated signals, the method further comprises performing an IFFT on the n ICI-eliminated signals after vertical spatial filtering.

6. The method according to claim 2, wherein, before performing the transversal filtering on the n received signals, the method further comprises performing a Fast Fourier Transform (FFT) on the n received signals to obtain n frequency-domain received signals;

wherein performing transversal filtering on the n received signals comprises performing transversal filtering on the n frequency-domain received signals in the frequency domain;

wherein, after the performing vertical spatial filtering on n received signals, the method further comprises performing an Inverse Fast Fourier Transform (IFFT) on the n received signals after vertical spatial filtering;

wherein, before generating the (n−1) ICI signals, the method further comprises performing an FFT on the (n−1) initial sliced signals to obtain (n−1) frequency-domain initial sliced signals;

wherein, generating the (n−1) ICI signals comprises generating (n−1) ICI signals in the frequency domain based on the (n−1) frequency-domain initial sliced signals; and wherein, after performing the vertical spatial filtering on the n ICI-eliminated signals, the method further comprises performing an IFFT on the n ICI-eliminated signals after vertical spatial filtering.

7. The method according to claim 2, wherein performing the transversal filtering on the n received signals comprises: performing transversal filtering on the n received signals in the time domain; and wherein generating the (n−1) ICI signals comprises generating the (n−1) ICI signals in the time domain.

8. An equalizer comprising:
a first vertical filtering unit, configured to perform vertical spatial filtering on n received signals, wherein n is a total number of receive antennas in a multiple-input multiple output MIMO system, and a coefficient for vertical spatial filtering corresponds to a received signal currently to be decoded among the n received signals;

a first combining unit, configured to combine internal sub-signals for the n received signals after vertical spatial filtering, to obtain an initial sliced signal and output it to other (n−1) equalizers, wherein the initial sliced signal corresponds to the received signal currently to be decoded;

an interference generating unit, configured to receive (n−1) initial sliced signals output by first combining units of the other (n−1) equalizers, wherein the (n−1) initial sliced signals respectively correspond to (n−1) received signals other than the received signal currently to be decoded among the n received signals, wherein each initial sliced signal is obtained by performing vertical spatial filtering on the n received signals and combining internal sub-signals for the n received signals after vertical spatial filtering, wherein a coefficient for each vertical spatial filtering corresponds to one of the (n−1) received signals other than the received signal currently to be decoded among the n received signals; and generate (n−1) inter-channel interference ICI signals based on the (n−1) initial sliced signals respectively corresponding to the (n−1) received signals other than the received signal currently to be decoded among the n received signals;

an interference eliminating unit, configured to eliminate ICI from the n received signals based on the (n−1) ICI signals to obtain n ICI-eliminated signals;

a second vertical filtering unit, configured to perform vertical spatial filtering on the n ICI-eliminated signals; and a second combining unit, configured to combine internal sub-signals for the n ICI-eliminated signals after vertical spatial filtering, to obtain a final sliced signal.

9. The equalizer according to claim 8, wherein:
the equalizer further comprises a transversal filtering unit, configured to perform transversal filtering on the n received signals;

the first vertical filtering unit is configured to perform vertical spatial filtering on the n received signals after transversal filtering; and the interference eliminating unit is configured to eliminate, based on the (n−1) ICI signals, ICI from the n received signals after transversal filtering, to obtain n ICI-eliminated signals.

10. The equalizer according to claim 9, further comprising a signal extracting unit and a delaying unit, wherein:
the signal extracting unit is configured to replicate and extract the n received signals after transversal filtering, to obtain n signals to be eliminated;

the delaying unit is configured to perform a delay processing on the n signals to be eliminated, to synchronize the n signals to be eliminated with the (n−1) ICI signals; and the interference eliminating unit is configured to eliminate the (n−1) ICI signals from the n signals to be eliminated after the delay processing.

11. The equalizer according to claim 10, wherein:
the transversal filtering unit is configured to perform transversal filtering on the n received signals in the time domain; and
the interference generating unit is configured to generate the (n−1) ICI signals in the time domain.

12. The equalizer according to claim 11, wherein:
the transversal filtering unit comprises a set of finite impulse response (FIR) filters; and
the interference generating unit comprises a set of FIR filters.

13. The equalizer according to claim 10, further comprising a first Fast Fourier Transform (FFT) unit, a second FFT unit, a first Inverse Fast Fourier Transform IFFT unit, and a second IFFT unit, wherein:
the first FFT unit is connected to the transversal filtering unit and is configured to perform an FFT on the n received signals to obtain n frequency-domain received signals, wherein:
the transversal filtering unit is configured to perform transversal filtering on the n frequency-domain received signals in the frequency domain;
the first IFFT unit is connected to the first vertical filtering unit and the first combining unit and is configured to perform an IFFT on the n received signals after vertical spatial filtering;
the second FFT unit is, connected to first combining units of the other (n−1) equalizers and the interference generating unit and is configured to perform an FFT on the (n−1) initial sliced signals to obtain (n−1) frequency-domain initial sliced signals;
the interference generating unit is configured to generate (n−1) ICI signals in the frequency domain based on the (n−1) frequency-domain initial sliced signals; and
the second IFFT unit is connected to the second vertical filtering unit and the second combining unit and is configured to perform an IFFT on n ICI-eliminated signals after vertical spatial filtering.

14. The equalizer according to claim 13, wherein:
the transversal filtering unit comprises a frequency domain equalizer (FDE); and
the interference generating unit comprises an FDE.

15. The equalizer according to claim 9, wherein:
the transversal filtering unit is configured to perform transversal filtering on the n received signals in the time domain; and
the interference generating unit is configured to generate the (n−1) ICI signals in the time domain.

16. The equalizer according to claim 15, wherein:
the transversal filtering unit comprises a set of finite impulse response (FIR) filters; and
the interference generating unit comprises a set of FIR filters.

17. The equalizer according to claim 9, further comprising a first Fast Fourier Transform (FFT) unit, a second FFT unit, a first Inverse Fast Fourier Transform IFFT unit, and a second IFFT unit, wherein:
the first FFT unit is connected to the transversal filtering unit and is configured to perform an FFT on the n received signals to obtain n frequency-domain received signals, wherein:
the transversal filtering unit is configured to perform transversal filtering on the n frequency-domain received signals in the frequency domain;
the first IFFT unit is connected to the first vertical filtering unit and the first combining unit and is configured to perform an IFFT on the n received signals after vertical spatial filtering;
the second FFT unit is, connected to first combining units of the other (n−1) equalizers and the interference generating unit and is configured to perform an FFT on the (n−1) initial sliced signals to obtain (n−1) frequency-domain initial sliced signals;
the interference generating unit is configured to generate (n−1) ICI signals in the frequency domain based on the (n−1) frequency-domain initial sliced signals; and
the second IFFT unit is connected to the second vertical filtering unit and the second combining unit and is configured to perform an IFFT on n ICI-eliminated signals after vertical spatial filtering.

18. The equalizer according to claim 17, wherein:
the transversal filtering unit comprises a frequency domain equalizer (FDE); and
the interference generating unit comprises an FDE.

19. An equalizer, comprising:
a processor; and
a non-transitory computer-readable storage medium storing instructions to be executed by the processor, the program including instructions for:
performing vertical spatial filtering on n received signals received from a MIMO system, wherein n is a total number of transmit antennas in the MIMO system;
combining internal sub-signals for the n received signals after vertical spatial filtering, to obtain an initial sliced signal and a coefficient for vertical spatial filtering corresponds to a received signal currently to be decoded among the n received signals, so that the initial sliced signal corresponds to the received signal currently to be decoded;
receiving (n−1) initial sliced signals respectively corresponding to (n−1) received signals other than the received signal currently to be decoded among the n received signals, wherein each initial sliced signal is obtained by performing vertical spatial filtering on the n received signals;
combining internal sub-signals for the n received signals after vertical spatial filtering, wherein a coefficient for each vertical spatial filtering corresponds to one of the (n−1) received signals other than the received signal currently to be decoded among the n received signals;
generating (n−1) inter-channel interference ICI signals based on the (n−1) initial sliced signals respectively corresponding to the (n−1) received signals other than the received signal currently to be decoded among the n received signals;
eliminating ICI from the n received signals based on the (n−1) ICI signals to obtain n ICI-eliminated signals; and
performing vertical spatial filtering on and combining internal sub-signals for the n ICI-eliminated signals, to obtain a final sliced signal.

* * * * *